US 6,647,515 B1

(12) United States Patent
Hefferon et al.

(10) Patent No.: US 6,647,515 B1
(45) Date of Patent: Nov. 11, 2003

(54) DETERMINATION OF THE DEGREE OF COMMON USAGE FOR ELEMENTS OF A DATA PROCESSING SYSTEM

(75) Inventors: Eugene P. Hefferon, Poughkeepsie, NY (US); Hans-Helge Lehmann, Weil im Schoenbuch (DE); William J. Rooney, Hopewell Junction, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/676,825

(22) Filed: Oct. 2, 2000

(51) Int. Cl.$^7$ ................................................. H04L 1/22
(52) U.S. Cl. .............................. 714/47; 714/37; 714/25
(58) Field of Search ................. 714/4, 25, 37, 714/47, 43; 707/2; 709/105

(56) References Cited

U.S. PATENT DOCUMENTS 5,463,768 A * 10/1995 Cuddihy et al. ............... 714/37
5,500,940 A * 3/1996 Skeie ........................... 714/25
6,092,214 A * 7/2000 Quoc et al. ..................... 714/4
6,237,114 B1 * 5/2001 Wookey et al. ................ 714/47
6,253,334 B1 * 6/2001 Amdahl et al. .................. 714/4
6,424,971 B1 * 7/2002 Kreulen et al. ................. 707/7
6,532,552 B1 * 3/2003 Benignus et al. .............. 714/25

* cited by examiner

Primary Examiner—Scott Baderman
Assistant Examiner—Joshua Lohn
(74) Attorney, Agent, or Firm—Floyd A. Gonzalez

(57) ABSTRACT

A method and apparatus for determining common usage of elements among at least two channels in a data processing system having an arbitrary hardware element hierarchy including multiple channel paths over which data is transmitted. An internally executed initialization program builds a bit mask for channel paths to be compared wherein the bit masks describe the hierarchy of the hardware elements in the channel paths to be compared. A compare program provides a comparison result whose value reflects the impact of the failure of hardware elements that are common to the channel path being compared. The comparison results contains multiple bits, with set bits representing each element which is common to the hardware element common to the channel paths being compared. The impact of a failure of a common hardware element is greater the more significant the bit position of that component resides in the comparison results.

15 Claims, 3 Drawing Sheets

DETERMINATION OF THE DEGREE OF COMMON USAGE FOR ELEMENTS OF A DATA PROCESSING SYSTEM

FIELD OF THE INVENTION

The present invention relates to determining the usage of elements of a data processing system and more particularly relates to the determination of the degree of common usage and the impact of failure of elements of a data processing system

BACKGROUND OF THE INVENTION

Host computer systems may perform input/output (I/O) operations against a storage unit, such as a Direct Access Storage Device (DASD), which is comprised of numerous interconnected hard disk drives (HDDs) that form a single mass storage space. In such systems, a storage controller, also referred to as a control unit, manages I/O operations between the host systems and the DASD. Examples of control units include the International Business Machines (IBM) Enterprise Storage Server, described in the publication "IBM Enterprise Storage Server: Introduction and Planning Guide ", IBM document no. GC26-7294-02 November 1999) and the IBM 3990 Storage Controller, described in IBM publication, "IBM 3990 Storage Control Reference (Models 1, 2, and 3), IBM document no. GA32-0099-06 (1988, 1994), which publications are incorporated herein by reference in its entirety.

The hosts include a channel subsystem that directs the flow of data between the host main storage and the storage controllers. In current implementations, each host may have up to 256 channels. Each channel is identified by a channel path identifier (CHPID). A channel comprises all those individual hardware components that are used to provide a single communication path between host memory and the channel adapter 108. A channel path is defined to be a channel and all the external physical hardware components that are used to access all the I/O devices it is defined to access. A channel path comprises the physical connection from a host channel adapter to a port on a switch, such as an ESCON director, and the set of all connections from other ports on the same switch to the interface ports in the control units defined to access that channel. In current implementations, a channel path in the host may be dynamically assigned to one physical path comprising the connection links from the host adapter to the switch port, and then from other ports on the same switch to interface ports on control units attached to the same switch. The commonly assignee and co-pending U.S. patent application Ser. No. 09/407,544, entitled "Method, system, and Program Products for Managing I/O Configurations of a Computing Environment " filed on Sep. 28, 1999 by P. B. Yocom, H. M. Yudenfriend, W. J. Rooney, Richard Cwiakala, which patent is incorporated herein by reference in its entirety, describes an architecture for allowing the dynamic assignment of channel paths in the host to different physical paths from the host to the control unit.

The above patent mentions that one goal of dynamically assigning host channel paths to a physical path is to find the path assignment for a channel path the provides the best availability, i.e., avoids any single point of failures. The Operating System that is reconfiguring the channel paths requires a way to determine the extent to which two or more channels share system elements and the degree to which each of those shared elements would impact system operations in the event of failure. Furthermore, this information is required in a machine independent form that does not require the Operating System to be aware of specific aspects of the hardware and microcode elements involved (i.e. constant changes to the program to accommodate new machines).

SUMMARY OF THE INVENTION

The present invention provides a channel-subsystem call (CHSC) instruction using the Compare-Channel-Components command that allows the Operating System to request that the machine provide information about the degree to which element usage is in common between selected channels, and to provide an indication of the relative impact in the event of failure for those elements. This information allows the Operating System to select paths which minimize the degree of impact of failures in elements that are associated with the channels being considered for dynamic configuration changes. The present invention further provides the Operating System with a mechanism that provides machine independent information about the existence of common hardware elements between channels, and an indication of the relative scope of failure in those elements.

It is an object of the present invention to determine hardware elements which are common to channels in a data processing system.

It is another object of the present invention to provide an initialization program that builds a bit mask representing an arbitrary hierarchy of hardware elements of comprising a channel to be compared, and to provide a comparison program which determines hardware elements that are common to the hardware elements of the channels being compared and which gives comparison results whose value indicates the impact of the failure of the common hardware elements.

These and other objects will be apparent to one skilled in the art from the following drawings and detailed description of the invention.

DESCRIPTION OF THE PREFERRED EMBODIMENT

Other co-pending and commonly assigned patent applications related to the present invention are: U.S. patent application Ser. No. 09/671,216 Filed Sep. 27, 2000 by B. C. Breadsley et al. For SYSTEM, METHOD, AND PROGRAM FOR DETERMINING THE AVAILABILITY OF INTERFACES TO A CONTROL UNIT (attorney docket no. TUC990058US1); U.S. patent application Ser. No. 09/670, 737 Filed Sep. 27, 2000 by W. J. Rooney et al. For SYSTEM, METHOD, AND PROGRAM FOR DETERMINING THE AVAILABILITY OF PATHS TO A DEVICE (attorney docket no. POU920000103US1); and U.S. patent application Ser. No. 09/671,416 filed Sep. 27, 2000 by B. C. Beardsley for SYSTEM, METHOD, AND PROGRAM FOR DETERMINING THE AVAILABILITY OF INTERFACES TO A DEVICE FROM INFORMATION PROVIDED BY THE DEVICE (attorney docket no. POU920000104US1), all incorporated herein by reference.

Figure 1:
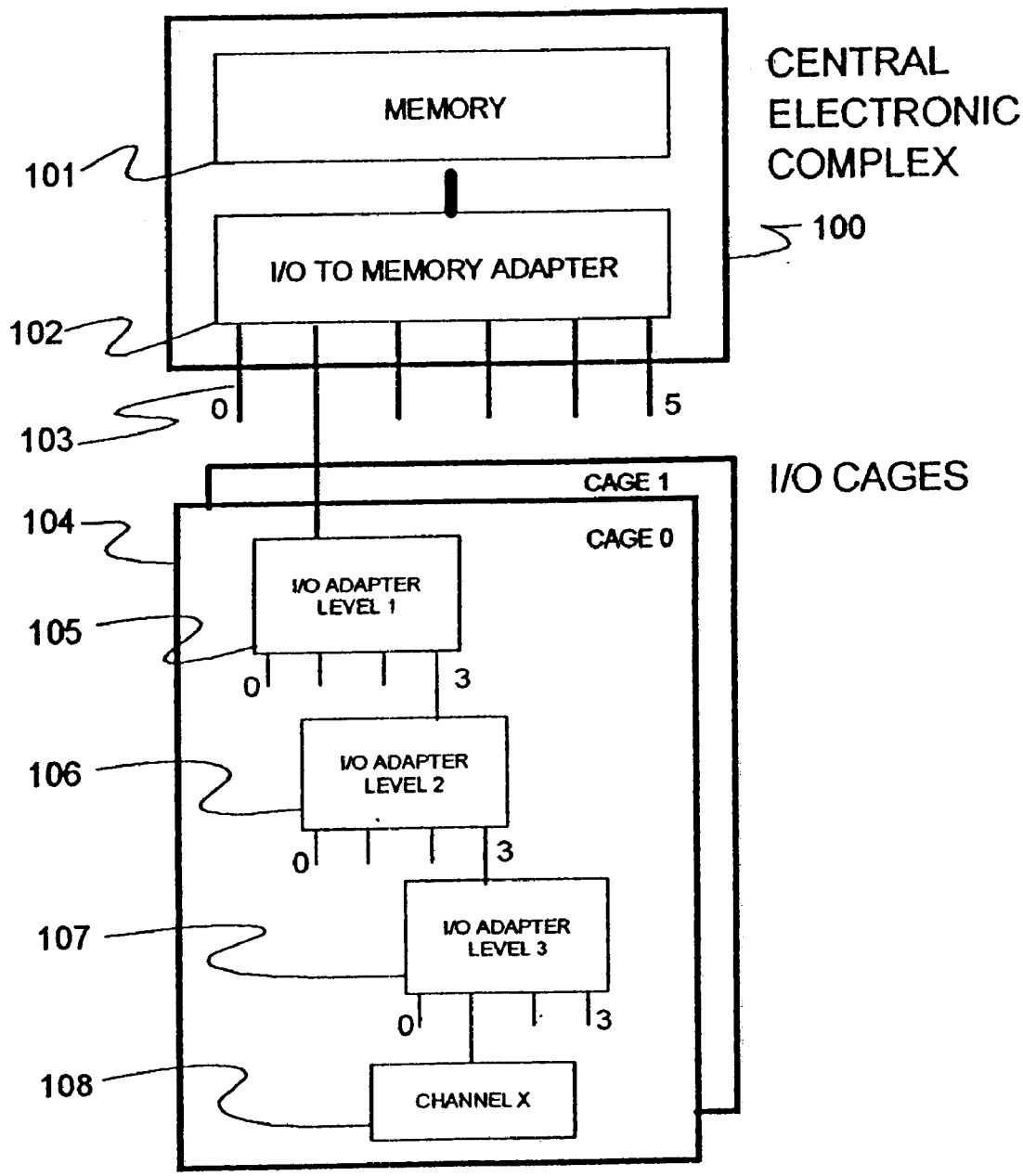
FIG. 1 is a schematic diagram of a computer system showing a typical hardware hierarchy usable with the present invention.

FIG. 1 is an example of a typical hardware hierarchy for a computer system. The Central Electronics Complex (CEC) 100 is comprised of a central processing unit (CPU) (not shown), memory 101, and adapters 102 that provide access to and from memory for the I/O channels. Each I/O memory adapter 102 attaches to multiple I/O level 1 adapters 105. These I/O adapters may reside in different physical packages or cages 104. Additionally, each I/O level 1 adapter can attach to multiple I/O adapter levels 106, 107 before attaching to the actual channel adapter 108. A channel comprises all those individual hardware components that are used to provide a single communication path between host memory and the channel adapter 108.

Each channel in the system can be represented by a channel component bit mask consisting of a unique value for each physical component used to connect the channel adapter 108 to the memory 102 of the CEC 100. In the example shown in FIG. 1, channel x has a corresponding Channel Component Bit Mask value of 0x007D hex including: cage 0, 104; memory adapter 1, 102; I/O adapter level 1 output 3, 105; I/O adapter level 2 output 3, 106; and I/O adapter level 3 output 1, 107. Table I shows how the Channel Component Bit Mask value is determined.

TABLE I

CHANNEL X CHARACTERISTICS:

CAGE NUMBER (n) = 0
I/O to Memory Adapter(mmm) = 1
I/O Adapter Level 1 (aa) = 3
I/O Adapter Level 2 (bb) = 3
I/O Adapter Level 3 (cc) = 1

CORRESPONDING BIT MASK:

0123456789ABCDEF
000000nmmmaabbcc
0000000001111101 = 007D hex

System Initialization for Component Bit Masks

Figure 2:
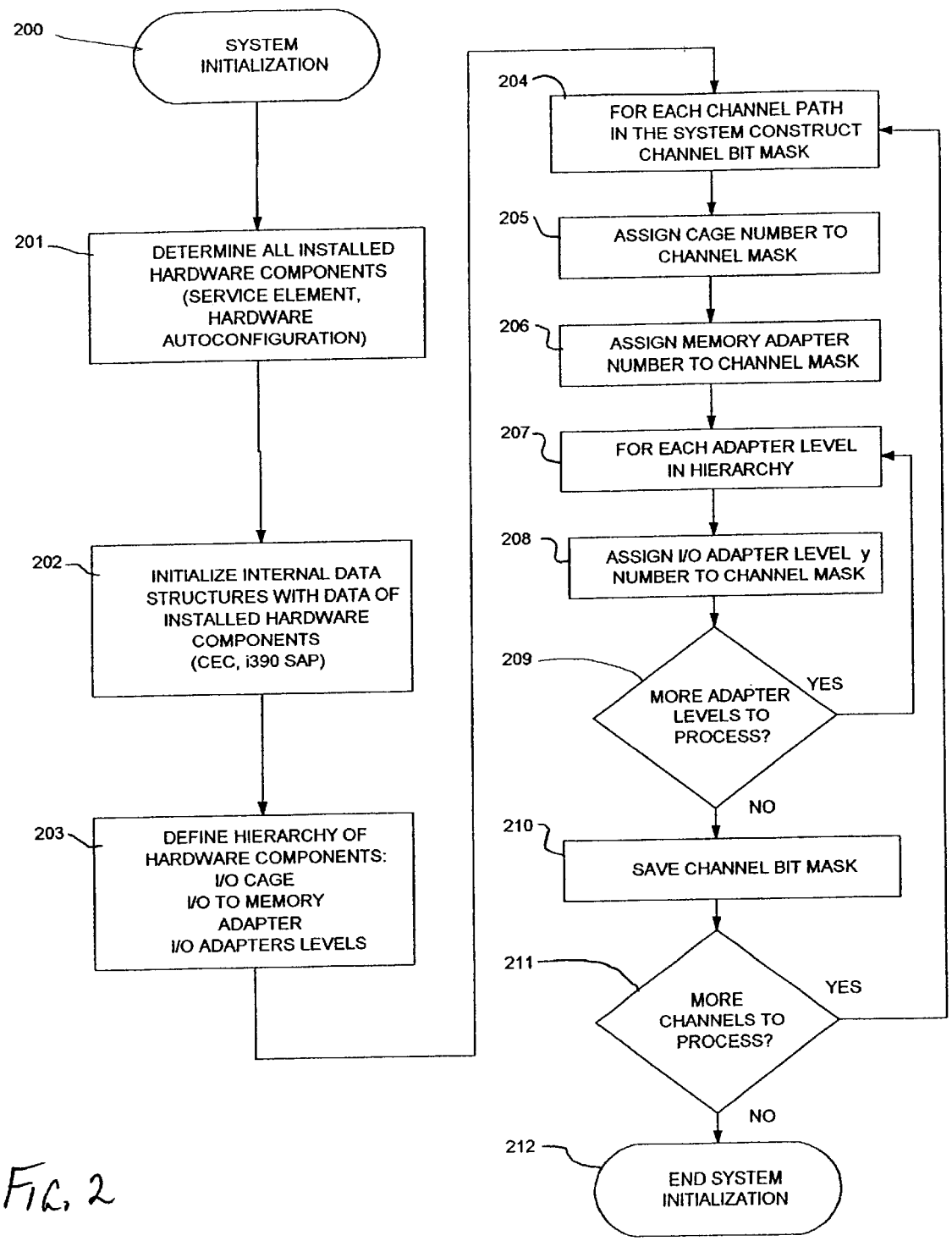
FIG. 2 is a flow diagram showing the processing performed by the channel subsystem of the computer system of FIG. 1 during system and channel initialization.
Figure 3:
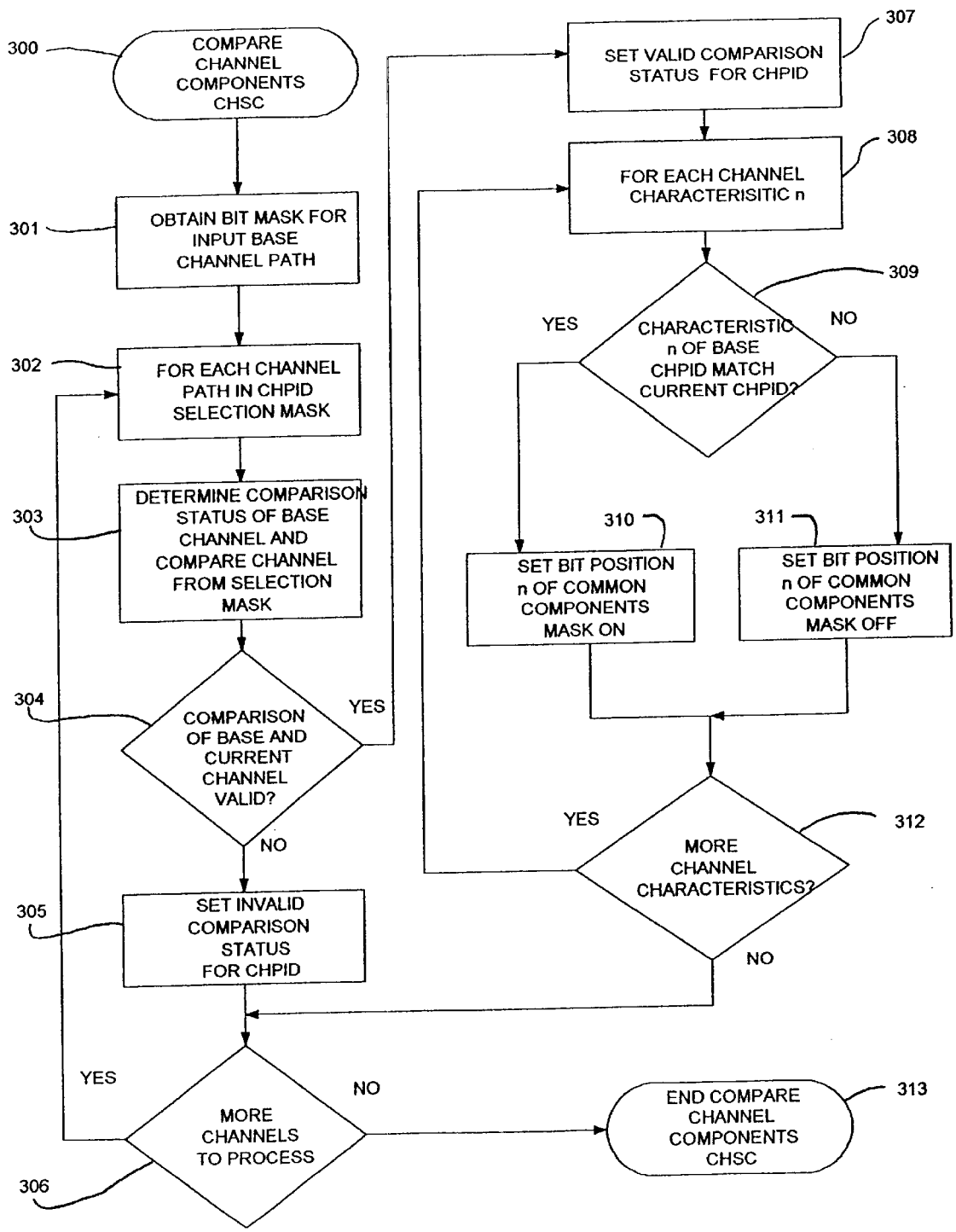
FIG. 3 is a flow diagram showing the Compare-Channel-Components CHSC command executed by the operating system of the computer system of FIG. 1 to determine if the selected managed channel provides adequate availability characteristics in order to avoid a single point of failure.

FIG. 2 shows the processing performed by the channel subsystem during system initialization 200. First, the channel subsystem determines all the installed hardware components for all the channels in the system at 201. This information is used to construct tables at 202 that represent the hardware components of the system and their relative hierarchy at 203. Then, for each channel in the system a Channel Component Bit Mask is constructed at 204 in order to represent all the physical hardware components that make up the channel. For each channel, at 205 the corresponding cage number is assigned to the component bit mask, at 206 the corresponding I/O memory adapter, and at 207 the corresponding I/O adapter levels 1-n are processed, and finally at 208 are assigned to the component bit mask. At 209, a check is made to determine if all adapters have been processed. Once all the I/O adapter levels have been assigned to the component bit mask the resulting Channel Component Bit Mask is saved at 210 for future reference by the Compare-Channel-Components CHSC command, to be discussed in connection with FIG. 3. Processing continues to the next channel at 211. Once all the channels have been processed, system initialization ends at 212.

When the host operating system decides that a channel path needs to be added to a control unit in order to increase the aggregate bandwidth required or to be removed from a control unit to decrease the aggregate bandwidth, it selects a candidate managed channel path.

The Compare-Channel-Components CHSC command is then used to determine if the selected managed channel provides adequate availability characteristics in order to avoid a single point of failure. The CHSC request block is constructed with the candidate managed channel path identifier is used as the base channel path for comparison. For each channel path that is already defined for the control unit, its corresponding bit mask is set on in the CHPID selection mask of the command request block and the Compare-Channel-Components CHSC command is issued. At 300 the channel subsystem then receives control to process the CHSC command. At 301 The channel subsystem first obtains the component bit mask for the input base CHPID contained in the command request block that was created during system initialization at 210. Then at 302, for each channel path identifier specified in the input CHPID selection mask of the command request block, and the channel subsystem fetches the corresponding component bit mask at 303. If the channels are not of similar type such that they can be compared at 304, then at 305, the comparison results block of the command response block for that channel path identifier has its Comparison Status field set to indicate that the channels are not comparable and processing continues at 306 to the next channel in the CHPID selection mask.

If the channels are similar at 304, then the corresponding comparison results block of the command response block has its Comparison Status field set to valid at 307. Next, the channel component bit mask of the current CHPID specified in the CHPID Selection Mask is compared to the channel component bit mask of the base CHPID. At 308, for each channel characteristic of the channel component bit mask, the value of the bit mask in the two channels is compared at 309. If the two component values are the same, then the corresponding bit is set on at 310 in the Common Components Bit Mask for the current CHPID in the CHSC command response block.

If the two component values are not the same at 309, then the corresponding bit is set off at 311 in the Common Components Bit Mask for the current CHPID in the CHSC command response block. A check is made at 312 to see if there are more characteristics. If yes, the program returns to 308, and the same process is performed for every characteristic of the two channels. Once all the channel characteristics are compared at 312, processing returns to 306 to continue on to the next channel path identifier.

Once all the channel paths identifiers have been processed as determined at 306 the CHSC command terminates at 313.

The resulting Common Component bit masks contained in the CHSC response block are then used by the host operating system to determine if the candidate channel path can be used to access the target control unit with the maximum possible availability characteristics.

The CHSC Compare-Channel-Components command will now be described. The Compare-Channel-Components command is used to determine whether channel-subsystem components that are used to access a specified channel are also used to access other specified channels.

Request Block

The command-request block for compare channel components has the format as follows in TABLE II:

TABLE II

```
Word    0  |    '0030'    |    '001D'    |
        1  |00000000 00000000 00000000| CHPID |
        2  |00000000 00000000 00000000 00000000|
        3  |00000000 00000000 00000000 00000000|
        4  |                                   |
           //    CHPID Selection Mask        //
        11 |                                   |
           0              16       24        31
```

L1: Bytes 0–1 contain the value 0030 hex, specifying a command-request-block length of 48 bytes.

Command Code: Bytes 2–3 of word 0 contain the value 001D hex, specifying the compare-channel-components command.

Reserved: Bytes 0–2 of word 1, and words 2 and 3 must contain zeros.

CHPID: Byte 3 of word 1 identifies a channel path identifier. The channel-subsystem components that are used to access the channel path are used as the basis for comparison with the channel-subsystem components that are used to access the channel paths designated in the CHPID-selection-mask field. The results of these comparisons are stored in comparison-results blocks.

CHPID Selection Mask (CSM): Words 4–11 contain a 256-bit mask. Each bit of the mask corresponds to a CHPID having the same value as the position (left to right) of the bit in the CHPID-selection-mask (CSM) field. Bit 0 of the CSM field corresponds to CHPID 0, bit 1 of the CSM field corresponds to CHPID 1, and so forth.

When one, a bit in the CHPID-selection-mask field specifies that component-comparison information is requested for the channel path designated by the corresponding CHPID.

When zero, a bit in the CHPID-selection-mask field specifies that no component-comparison information is requested for the channel path designated by the corresponding CHPID.

Response Block

The command-response block for compare channel components has the format as follows in TABLE III:

TABLE III

```
Word   0 |      L2       |  Response Code |
       1 |00000000 00000000 00000000 00000000|
       2 |    Reserved   |       BS       |
       3 |00000000 00000000 00000000 00000000|
       4 |                                   |
         //   Component Comparisons        //
       N |                                   |
         0              16      28        31
```

L2: Bytes 0–1 of word 0 specify the length in bytes of the command-response block. The length depends on the response code that is stored as a result of the attempt to execute the compare-channel-components command.

If a response code other than 0001 hex is stored in the response-code field, no comparison-results blocks are stored in the component-comparisons field and L2 specifies a length of eight bytes for the command-response block.

If a response code of 0001 hex is stored in the response-code field, the component-comparisons field contains 256 comparison-results blocks and L2 specifies a command-response-block length of 16 bytes plus 256 times the number of bytes specified in the BS field.

Response Code: Bytes 2–3 of word 0 contain a 16-bit unsigned binary integer that describes the results of the attempt to execute the compare-channel-components command. The valid response codes are 0001, 0003, 0004 hex and the command-specific response codes listed below in the section "Special Conditions."

Reserved: Word 1, bits 0–27 of word 2, and word 3 contain zero.

Block Size (BS): Bits 28–31 of word 2 contain a 4-bit unsigned binary integer that specifies the number of bytes for every comparison-results block in the component-comparisons field. The BS value is in the range 1–12.

Component Comparisons: When response code 0001 hex is stored, 256 comparison-results blocks (CRBs) of the same size are stored in contiguous locations beginning at byte 0 of word 4 of the command-response block.

Each CRB corresponds to a CHPID having the same value as the position (left to right) of the CRB in the component-comparisons field. The leftmost CRB in the component-comparisons field corresponds to CHPID 0, the next CRB corresponds to CHPID 1 and so forth.

When the CSM bit for a CHPID is zero, no comparison of channel-subsystem components is performed for the CHPID that corresponds to that bit and the contents of the CRB for that CHPID are zeros and have no meaning.

When the CSM bit for a CHPID is one, the CRB for that CHPID contains meaningful shared component utilization information. The format of the comparison-results block is as follows in TABLE IV:

TABLE IV

```
 -- -------------- /------------------
|CS|   Common     Components          |
 -- -------------- /------------------
 0  2                                n
```

Comparison Status (CS): Bits 0 and 1 contain a value that specifies whether a comparison of channel-subsystem components was performed between the channel path designated by the CHPID specified in the CHPID field and the channel path designated by the CHPID that corresponds to this CRB. The meaning of each CS value is as follows:

| Value | Meaning |
|---|---|
| 0 | A comparison of channel-subsystem components is complete and the results are indicated in the common-components field of this CRB. |
| 1 | A comparison of channel-subsystem components was not performed because the type of channel-subsystem components that are used to access the channel path designated by the CHPID specified in the CHPID field are not sufficiently similar to the type of channel-subsystem components that are used to access the channel path designated by the CHPID that corresponds to this CRB. The contents of the common-components field in this CRB have no meaning. |
| 2 | A comparison of channel-subsystem components was not performed because the channel path designated by the CHPID that corresponds to this CRB is not described in the I/O-configuration definition in the channel subsystem. The contents of the common-components field in this CRB have no meaning. |
| 3 | Reserved. |

Common Components: Bits 2–n of the CRB are a string of bits that correspond to the channel-subsystem components that can be used to access the channel path designated by the CHPID specified in the CHPID field. The bit string can range from 6 to 94 bits, depending on the BS value.

When one, a bit in the common-components field indicates that the channel-subsystem component represented by the bit is used to access both the channel path designated by the CHPID specified in the CHPID field, and the channel path designated by the CHPID that corresponds to this CRB.

When zero, a bit in the common-components field indicates that the channel-subsystem component represented by the bit is not used to access both the channel path designated by the CHPID specified in the CHPID field, and the channel path designated by the CHPID that corresponds to this CRB.

The correspondence between channel subsystem components and bits of the common components field is machine dependent. However, the correspondence is such that the component that has the most significant impact on the operation of the two channel paths when the component fails is represented by the left-most bit of the common-components field. The further a bit is to the right, the less significant is the impact of the component when it fails.

Special Conditions

A special condition exists if a response code other than 0001 hex is stored in the command-response block, indicating that the execution of the command is suppressed. The special conditions for the compare-channel-components command are as follows:

'0003': Response code 0003 hex is stored if the L1 field contains a value other than 0030 hex or a reserved request-block field does not contain zero.

'0004': Response code 0004 hex is stored if the command is not provided by the model.

'0100': Response code 0100 hex is stored when the channel path specified in the CHPID field of
the request block is not described in the I/O configuration definition in the channel subsystem or it is a type of channel path for which the channel subsystem does not perform component comparisons.

'0105': Response code 0105 hex is presented when model-dependent controls have detected that the issuing program is not authorized to execute the compare-channel-components command.

Notes:

The correspondence between bit positions of the common-components field (in the comparison-results block) and channel-subsystem components is based on significance of impact on the operation of the two channel paths when the components fail. The greater the impact of a failing component, the more to the left is the common-components bit that represents the component. It will be understood that the bits in the comparison-results block may be read as a number whose value reflects the impact of a failing component.

Criteria used to assign "significance of impact" may include, but is not limited to things such as:

Scope of the impact of a failure percentage of channel-path operations lost, whether one or both channel paths are affected, impact to system operations to restore channel-path operations, and anticipated outage time, While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. In a data processing system having an arbitrary hardware element hierarchy including multiple arrangements of said hardware elements, a method of determining common usage of the hardware elements among at least two of the arrangements, said method comprising:

building by an internally executed initialization operation, an indication describing the hierarchy of each of the hardware element arrangements to be compared; and comparing said indications with a compare operation which provides a value reflecting the impact of the failure of common hardware elements.

2. The method of claim 1 wherein said hardware element arrangements are channels in the data processing system over which data is transmitted.

3. The method of claim 1 wherein said initialization operation builds a bit mask representing each hardware element in the arrangement to be compared.

4. The method of claim 1 wherein said compare operation only provides said value for hardware element arrangements that are comparable.

5. The method of claim 1 where said compare operation provides comparison results having multiple bits wherein each set bit represents a hardware element that is common to the arrangements being compared, and failure of said common hardware element has a greater impact on the hardware element arrangements the farther its set bit appears to the left in the comparison results.

6. In a data processing system having a hardware element hierarchy including multiple arrangements of said hardware elements, an apparatus for determining common usage of the hardware elements among at least two of the arrangements, said apparatus comprising:

means for building by an internally executed initialization operation, an indication describing the hierarchy of each of the hardware element arrangements to be compared; and means for comparing said indications with a compare operation which provides a value reflecting the impact of the failure of common hardware elements.

7. The apparatus of claim 6 wherein said hardware element arrangements are channels in the data processing system over which data is transmitted.

8. The apparatus of claim 6 wherein said initialization operation includes means for building a bit mask for each hardware element arrangement to be compared.

9. The apparatus of claim 6 wherein said compare operation includes means for providing said value only for hardware element arrangements that are comparable.

10. The apparatus of claim 6 where said compare operation includes means for providing comparison results having multiple bits wherein each set bit represents a hardware element common to the hardware element arrangements being compared, and failure of said common hardware element has a greater impact on the hardware element arrangements the farther its set bit appears to the left in the comparison results.

11. In a data processing system having an arbitrary hardware element hierarchy including multiple arrangements of said hardware elements, an apparatus for determining common usage of the hardware elements among at least two of the arrangements, said apparatus comprising:

an internally executed initialization program in said data processing system providing an indication describing the hierarchy of each of the hardware element arrangements to be compared; and a compare program in said data processing system providing a value reflecting the impact of the failure of common hardware elements.

12. The apparatus of claim 11 wherein aid hardware element arrangements are channel paths in the data processing system over which data is transmitted.

13. The apparatus of claim 11 wherein said initialization program builds a bit mask for each hardware element arrangement to be compared.

14. The apparatus of claim 11 wherein said compare program providing said value only for hardware element arrangements that are comparable.

15. The apparatus of claim 11 where said compare program for provides comparison results having multiple bits wherein each set bit represents a hardware element common to the arrangement being compared, and failure of said common hardware element has a greater impact on the hardware element arrangements the farther its set bit appears to the left in the comparison results.

\* \* \* \* \*

UNITED STATES PATENT AND TRADEMARK OFFICE
CERTIFICATE OF CORRECTION

PATENT NO.    : 6,647,515 B1
DATED         : November 11, 2003
INVENTOR(S)   : Hefferon et al.

It is certified that error appears in the above-identified patent and that said Letters Patent is hereby corrected as shown below:

Column 10,
Line 11, "12. The apparatus of claim 11 wherein aid hardware" should read
-- 12. The apparatus of claim 11 wherein said hardware --

Signed and Sealed this

Twenty-sixth Day of October, 2004

JON W. DUDAS
*Director of the United States Patent and Trademark Office*